(12) United States Patent
Xiong et al.

(10) Patent No.: US 10,679,675 B2
(45) Date of Patent: Jun. 9, 2020

(54) MULTIMEDIA FILE JOINING METHOD AND APPARATUS

(71) Applicant: Tencent Technology (Shenzhen) Company Limited, Shenzhen (CN)

(72) Inventors: Tao Xiong, Shenzhen (CN); Lingrui Cui, Shenzhen (CN); Lei Ying, Shenzhen (CN); Faqiang Wu, Shenzhen (CN); Bin Fu, Shenzhen (CN); Qianyi Wang, Shenzhen (CN); Yanggang Dai, Shenzhen (CN)

(73) Assignee: Tencent Technology (Shenzhen) Company Limited, Shenzhen, Guangdong Province (CN)

( * ) Notice: Subject to any disclaimer, the term of this patent is extended or adjusted under 35 U.S.C. 154(b) by 88 days.

(21) Appl. No.: 16/024,136

(22) Filed: Jun. 29, 2018

(65) Prior Publication Data

US 2018/0330757 A1     Nov. 15, 2018

Related U.S. Application Data

(63) Continuation-in-part of application No. PCT/CN2017/076580, filed on Mar. 14, 2017.

(30) Foreign Application Priority Data

Mar. 14, 2016    (CN) .......................... 2016 1 0144319

(51) Int. Cl.
*G11B 27/19*     (2006.01)
*H04N 21/43*     (2011.01)
(Continued)

(52) U.S. Cl.
CPC ........ *G11B 27/19* (2013.01); *G11B 20/00007* (2013.01); *G11B 27/031* (2013.01);
(Continued)

(58) Field of Classification Search
CPC . G11B 27/19; G11B 20/00007; G11B 27/031; G11B 27/34; G11B 2020/00072; H04N 21/43
See application file for complete search history.

(56) References Cited

U.S. PATENT DOCUMENTS

| | | | |
|---|---|---|---|
| 2009/0087161 A1* | 4/2009 | Roberts | G11B 27/031 386/282 |
| 2014/0082666 A1* | 3/2014 | Bloch | H04N 21/8541 725/37 |
| 2016/0014347 A1* | 1/2016 | Van Eynde | G11B 27/036 386/280 |

FOREIGN PATENT DOCUMENTS

| | | |
|---|---|---|
| CN | 101374231 A | 2/2009 |
| CN | 101771869 A | 7/2010 |

(Continued)

OTHER PUBLICATIONS

Tencent Technology, ISRWO, PCT/CN2017/076580, dated Jun. 22, 2017, 7 pgs.

(Continued)

*Primary Examiner* — Thai Q Tran
*Assistant Examiner* — Sunghyoun Park
(74) *Attorney, Agent, or Firm* — Morgan, Lewis & Bockius LLP

(57) ABSTRACT

This application discloses a multimedia file joining method performed by an apparatus. After obtaining a first video clip and a second video clip to be joined, the apparatus obtains an audio file corresponding to the first video clip and the second video clip. The audio file records the first start and end time points of the first video clip and the second start and end time points of the second video clip. The apparatus adjusts the first video clip to play the first video clip in a first time period indicated by the first and end time points, and adjusts the second video clip to play the second video clip (Continued)

in a second time period indicated by the second and end time points with the first time period not overlapping the second time period. Finally, the apparatus performs a joining operation on the adjusted first video clip and the adjusted second video clip, to obtain a joined video file.

17 Claims, 3 Drawing Sheets

(51) Int. Cl.
*G11B 20/00* (2006.01)
*G11B 27/031* (2006.01)
*G11B 27/34* (2006.01)

(52) U.S. Cl.
CPC ............ *G11B 27/34* (2013.01); *H04N 21/43* (2013.01); *G11B 2020/00072* (2013.01)

(56) References Cited

FOREIGN PATENT DOCUMENTS

| | | |
|---|---|---|
| CN | 101996662 A | 3/2011 |
| CN | 103167320 A | 6/2013 |
| CN | 104980794 A | 10/2015 |
| CN | 105208464 A | 12/2015 |
| CN | 105392024 A | 3/2016 |
| CN | 105791938 A | 7/2016 |
| JP | H1169290 A | 3/1999 |
| JP | 2006203009 A | 8/2006 |
| JP | 2008022519 A | 1/2008 |
| JP | 2008278492 A | 11/2008 |
| JP | 2010164922 A | 7/2010 |
| JP | 2010541415 A | 12/2010 |
| KR | 20110094010 A | 8/2011 |
| WO | WO 2010068175 A2 | 6/2010 |

OTHER PUBLICATIONS

Tencent Technology, IPRP, PCT/CN2017/076580, dated Sep. 18, 2018, 6 pgs.

* cited by examiner

MULTIMEDIA FILE JOINING METHOD AND APPARATUS

RELATED APPLICATIONS

This application is a continuation-in-part of PCT Application No. PCT/CN2017/076580, entitled "MULTIMEDIA FILE JOINING METHOD AND APPARATUS", filed Mar. 14, 2017, which claims priority to Chinese Patent Application No. 201610144319.0, entitled "MULTIMEDIA FILE JOINING METHOD AND APPARATUS" filed with the Patent Office of China on Mar. 14, 2016, all of which are incorporated by reference in their entirety.

FIELD OF THE TECHNOLOGY

This application relates to the field of multimedia data processing, and specifically, to a multimedia file joining method and apparatus.

BACKGROUND

Currently, when videos generated by an Android operating system and an Internetworking Operating System ("iOS" for short) system are joined into a single continuously playable video, the separately generated videos need to be decoded by using their respective decoding programs on their corresponding native operating systems into video frames first. For example, videos generated by an Android system will have a sequence parameter set ("sps" for short) and a picture parameter set ("pps" for short) of the Android system, and an Android system video decoding program will use those sps and pps parameters in the video files to convert each of those video files into a respective sequence of image frames. Similarly, videos generated by an iOS system will have an sps parameter and a pps parameter of the IOS system, and an iOS system video decoding program will use those sps and pps parameters in the video files to convert each of those video files into a respective sequence of image frames. For videos produced on both operating systems, the video bit streams in a video file are decoded into pictures frame by frame, and the pictures are displayed on a user interface for viewing. When the video files generated by the Android system and the IOS system are played in a mixed sequence as a continuous stream, a problem of incompatibility occurs because if the decoding performed based on either the Android decoding program or the iOS decoding program will render the video files produced using the other operating system unplayable. For example, if the decoding is performed by using sps and pps parameters of the Android system, display of the video of the IOS system would be abnormal, and if decoding is performed by using the sps and pps parameters of the IOS system, display of the video of the Android system would be abnormal. Therefore, when videos of an Android system and an IOS system are joined into a single continuously playing video stream, an existing technical solution is first reading a video file of the Android system, decoding video bit streams into pictures frame by frame by using sps and pps parameters in the Android video file, then, reading a video file of the iOS system, and decoding video bit streams into pictures frame by frame by using sps and pps parameters in the iOS video file; and further, providing all the decoded picture frames to a video encoder and performing uniform compression and encoding to generate new video bit streams and obtain a set of new uniform sps and pps parameters, thereby generating a target video file that can be played continuously as a single image stream. However, when the video files generated by the Android system and the iOS system are joined by using the foregoing processing method, the decoding and encoding processes are time-consuming and cumbersome. Therefore, during a video joining process, a large amount of time is consumed, which is disadvantageous to the real-time viewing experience of a user.

Moreover, with a rise of lip-syncing joint performances, video clips of two terminals running different operating systems need to be accurately and rapidly joined, and then, rapid joining of the video clips cannot be achieved by using the foregoing method, and meanwhile, when video joining is performed by using the foregoing method, usually, because a time length of a video clip recorded by a user is too long or too short, positions of lips of the user do not accurately correspond to the audio that they are supposed to match. Consequently, the integrity and seamlessness of the final product is greatly reduced.

For the foregoing problem, no effective solution has been provided at present.

SUMMARY

Embodiments of this application provide a multimedia file joining method and apparatus, to at least resolve a technical problem of supporting real-time playback of a video with constituent parts recorded on different operating systems and a technical problem of relatively low synthesis precision in audio and video joining processes in related technologies.

According to an aspect of the embodiments of this application, a multimedia file joining method is provided, including obtaining a first video clip and a second video clip to be joined, the first video clip being from a first terminal, the second video clip being from a second terminal, and the first terminal and the second terminal running different operating systems; obtaining an audio file corresponding to the first video clip and the second video clip, the audio file recording first start and end time points of the first video clip and second start and end time points of the second video clip; adjusting the first video clip to play the first video clip in a first time period indicated by the first and end time points, and adjusting the second video clip to play the second video clip in a second time period indicated by the second and end time points, the first time period not overlapping the second time period; and performing a joining operation on the adjusted first video clip and the adjusted second video clip, to obtain a joined video file. In some embodiments, the video joining are performed without requiring real-time decoding of the first and second video clips into respective sequences of video image frames using their respective encoding/decoding parameters (e.g., first and second sets of sps and pps parameters, respectively) on their native operating systems (e.g., Android and iOS, respectively), and without requiring subsequent encoding of the two sequences of video image frames using a new set of common encoding/decoding parameters (e.g., a third set of sps and pps parameters that are distinct from the first and second sets of sps and pps parameters). Therefore, during playback of the joined video, there is no need to decode the joined video using the set of common encoding/decoding parameters. The mixed-platform video joining technology that does not requiring the conventional decoding and encoding of the constituent video parts using their respective native sps and pps parameters enables real-time playback of the mixed-platform multi-part video, allowing more time to improve the video joining and audio matching accuracy of the resulting joined video. This enables the system to provide a tool to create high quality videos with parts recorded by different people on different operating systems, and with separately recorded speech sound tracks. This also helps to enable online community creation of composite videos without the limitation of individual user's device types and operating systems, and without stringent requirement on the user's skill level in precisely controlling the recording lengths for a particular sound track.

According to another aspect of the embodiments of this application, a multimedia file joining apparatus is further provided, including: a first obtaining unit, configured to obtain a first video clip and a second video clip to be joined, the first video clip being from a first terminal, the second video clip being from a second terminal, and the first terminal and the second terminal running different operating systems; a second obtaining unit, configured to obtain an audio file corresponding to the first video clip and the second video clip, the audio file recording first start and end time points of the first video clip and second start and end time points of the second video clip; an adjusting unit, configured to adjust the first video clip to play the first video clip in a first time period indicated by the first and end time points, and adjust the second video clip to play the second video clip in a second time period indicated by the second and end time points, the first time period not overlapping the second time period; and a joining unit, configured to perform a joining operation on the adjusted first video clip and the adjusted second video clip, to obtain a joined video file. In some embodiments, the units are implemented as instructions encoded in hardware, firmware, and instructions stored on computer-readable storage medium that are executable by one or more processors of the apparatus to perform the operations described herein.

In the embodiments of this application, in a manner of obtaining a first video clip and a second video clip to be joined, the first video clip being from a first terminal, the second video clip being from a second terminal, and the first terminal and the second terminal running different operating systems; obtaining an audio file corresponding to the first video clip and the second video clip, the audio file recording first start and end time points of the first video clip and second start and end time points of the second video clip; adjusting the first video clip to play the first video clip in a first time period indicated by the first and end time points, and adjusting the second video clip to play the second video clip in a second time period indicated by the second and end time points, the first time period not overlapping the second time period; and performing a joining operation on the adjusted first video clip and the adjusted second video clip, to obtain a joined video file, the video files and the audio file can be accurately docked by adjusting the obtained first video clip from the first terminal into the first time period indicated by the first and end time points, and adjusting the obtained second video clip from the second terminal into the second time period indicated by the second and end time points, so as to increase video file and audio file joining precision, thereby producing a technical effect of synchronously playing the video files and the audio file, and further resolving the technical problem of relatively low synthesis precision in audio and video joining processes in related technologies.

BRIEF DESCRIPTION OF THE DRAWINGS

Accompanying drawings described herein are used to provide further understanding about this application, and constitute one portion of this application; and schematic embodiments of this application and their description are used to explain this application, and do not constitute an inappropriate limit on this application, wherein.

DESCRIPTION OF EMBODIMENTS

To make a person skilled in the art understand the solutions in this application better, the following clearly and completely describes the technical solutions in the embodiments of this application with reference to the accompanying drawings in the embodiments of this application. Apparently, the described embodiments are merely some instead of all of the embodiments of this application. All other embodiments obtained by a person of ordinary skill in the art based on the embodiments of this application without creative efforts shall fall within the protection scope of this application.

It should be noted that the terms "first", "second", and the like in the specification, the claims, and the foregoing accompanying drawings of this application are merely used for distinguishing similar objects, and do not need to be used for describing a special sequence or order. It should be understood that data used in this way can be interchanged in an appropriate case, so that the embodiments of this application that are described herein can be implemented in a sequence other than those sequences illustrated or described herein. Moreover, the terms "include", "have", and any variants thereof are intended to cover a non-exclusive inclusion. Therefore, a process, method, system, product, or device that includes a series of steps or elements not only includes such steps or elements that are clearly listed, but also includes other steps or elements that are not clearly listed or that are inherent to the process, method, product, or device.

Figure 1:
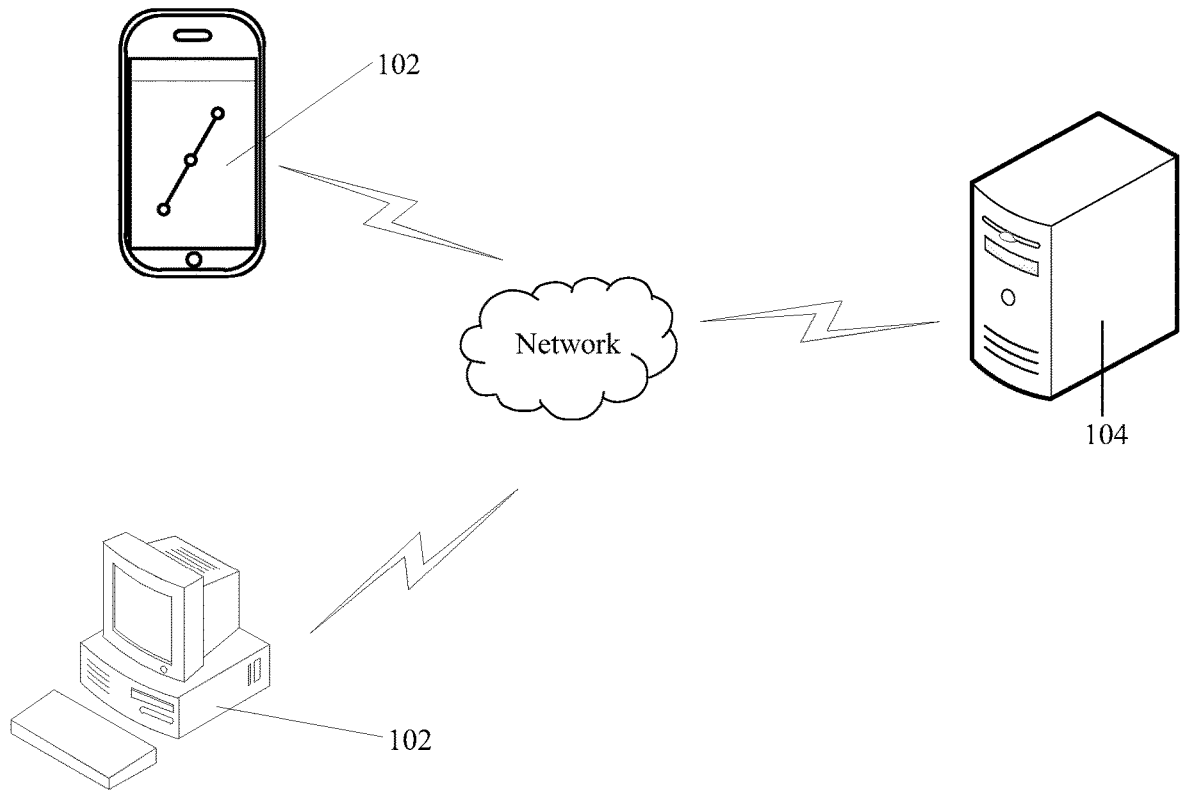
FIG. 1 is an architectural diagram of a hardware structure according to an embodiment of this application.

According to the embodiments of this application, a multimedia file joining method is provided. As shown in FIG. 1, the method includes the following.

Optionally, in this embodiment, the foregoing multimedia file joining method may be applied to a hardware environment formed by a server 104 and two or more terminals 102 shown in FIG. 1. FIG. 1 is an architectural diagram of a hardware environment according to an embodiment of this application. As shown in FIG. 1, a server 104 is connected to two or more terminals 102 through a network. The foregoing network includes, but is not limited to, a wide area network, a metropolitan area network, or a local area network. The terminals 102 include, but are not limited to, computers, mobile phones, tablet computers, and/or the like.

Figure 2:
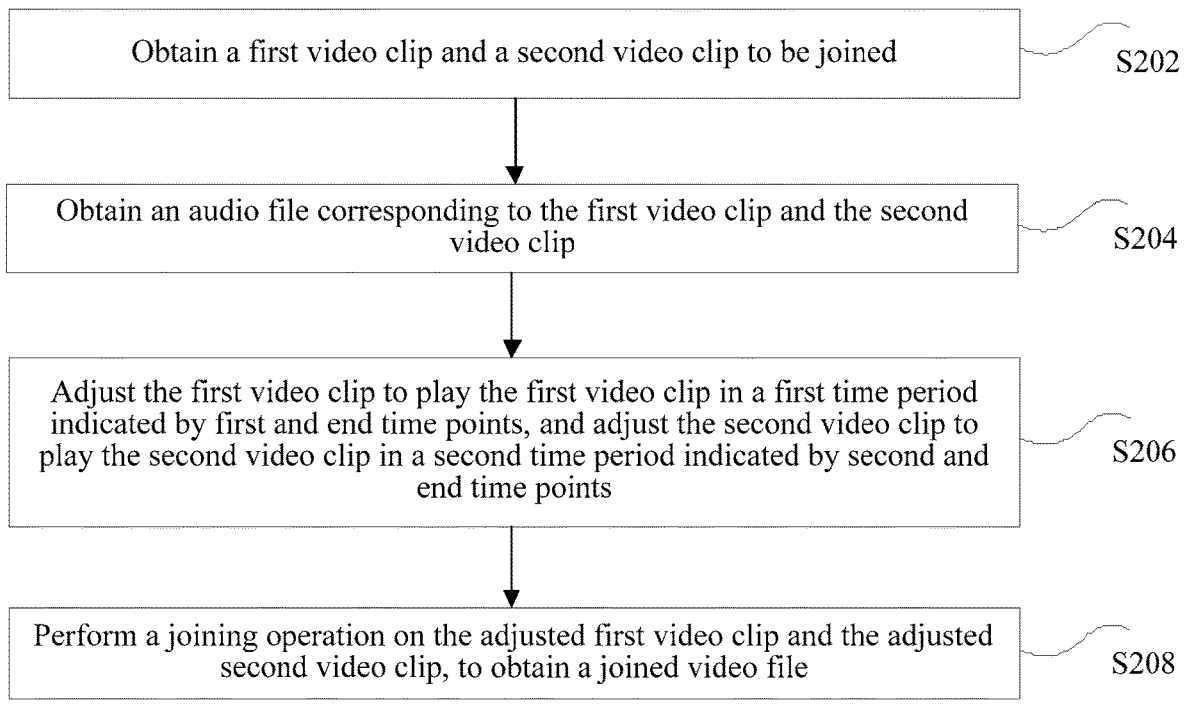
FIG. 2 is a flowchart of a multimedia file joining method according to an embodiment of this application.

FIG. 2 is a flowchart of a multimedia file joining method according to an embodiment of this application. The method is performed by a server (e.g., server 104) that is connected to two or more terminals (e.g., terminals 102). As shown in FIG. 2, the multimedia file joining method includes the following steps.

Step S202: Obtain a first video clip and a second video clip to be joined, the first video clip being from a first terminal, the second video clip being from a second terminal, and the first terminal and the second terminal running different operating systems.

Preferably, the first terminal and the second terminal are terminals running different operating systems. For example, the first terminal runs an Android system, and the second terminal runs an IOS system, or the first terminal runs a Windows system, and the second terminal runs an IOS system, and so on. The first video clip may be a video recorded by a user by using the first terminal, and the second video clip may be a video recorded by a user by using the second terminal.

In this embodiment of this application, the first terminal may be a plurality of terminals, and the plurality of terminals runs a same operating system, so that the first video clip is a plurality of video clips from a plurality of different first terminals; and the second terminal may be a plurality of terminals, and the plurality of terminals runs a same operating system, so that the second video clip is a plurality of video clips from a plurality of different second terminals. Further, this application is not limited to the foregoing first terminal and second terminal, and may further include a third terminal. An operating system running on the third terminal is different from both of the operating systems running on the first terminal and the second terminal. In some embodiments, the first terminal transmits its respective video clip with an identifier that corresponds to a first audio segment in an audio file or that corresponds to a first audio file, and the second terminal transmits its respective video clip with an identifier that corresponds to a second audio segment in the audio file or that corresponds to a second audio file. For example, the server optionally provides a speech sound track (and a sample video file that corresponds to the speech sound track) for multiple users to lips synch different roles represented in the speech sound track for playback on the first and second terminals. The users of the first and second terminals each record a video clip of themselves acting out (e.g., lip synching) a respective one of the different roles represented in the speech sound track. For example, if there are two roles A and B represented in the sound track, user 1 chooses to act as role A, and user B chooses to action as role B. They each record a video for the portion of the sound track during which their respective roles are talking, and submit the video to the server with the identifier of the role that the user is acting. The server will combine the videos and match the video to the corresponding portions of the sound track. In some embodiments, the tools provided by the server specifies the durations of audio segments that correspond to each role. In some embodiments, the durations are provided to the terminal devices (e.g., displayed on the scrub bar of the audio player on the terminal devices). In some embodiments, the server also provides a written description of the actions and words of the roles (e.g., closed caption text) represented in the audio sound track. In some embodiments, the audio sound track is a segment from a popular movie, a piece of news recording, a trending online video, etc. In some embodiments, the actual video image data is provided as a sample to the users for the users to imitate or build on. In some embodiments, the description, closed caption text, and audio segment durations are included in a description document that is downloaded to the terminals from the server with the audio sound track file for the video. In some embodiments, the terminals utilize the tools provided by the server to edit the video frames (e.g., applying various image beatifying filters) that are being captured during the recording of the video clips at the individual terminals. During the recording of the video clips, the audio file is played back and the closed caption is displayed for the user to lip synch the currently played audio content.

Step S204: Obtain an audio file corresponding to the first video clip and the second video clip, the audio file recording first start and end time points of the first video clip and second start and end time points of the second video clip.

Preferably, the foregoing first start and end time points are a play start time point and a play end time point of the first video clip that have been recorded in the audio file, and the second start and end time points are a play start time point and a play end time point of the second video clip that have been recorded in the audio file.

Step S206: Adjust the first video clip to play the first video clip in a first time period indicated by the first and end time points, and adjust the second video clip to play the second video clip in a second time period indicated by the second and end time points, the first time period not overlapping the second time period.

Preferably, to ensure that the first video clip is played in the first time period indicated by the first start and end time points, an image played in the first time period may be adjusted according to a time length of the first time period. Correspondingly, to ensure that the second video clip is played in the second time period indicated by the second start and end time points, an image played in the second time period may be adjusted according to a time length of the second time period.

Step S208: Perform a joining operation on the adjusted first video clip and the adjusted second video clip, to obtain a joined video file.

In this embodiment of this application, the video files and the audio file can be accurately docked by adjusting the obtained first video clip from the first terminal into the first time period indicated by the first and end time points, and adjusting the obtained second video clip from the second terminal into the second time period indicated by the second and end time points, so as to increase video file and audio file joining precision, thereby producing a technical effect of synchronously playing the video files and the audio file, and further resolving the technical problem of relatively low synthesis precision in audio and video joining processes in related technologies. In this solution, the video files are inserted into disjoint slots of the complete audio file, and the video clips are stretched or truncated to fit within the time durations specified for the disjoint slots. This method takes advantage of the fact that human ears are very sensitive to discontinuities and artifacts in the audio file, and an artificial distortion created in the joining of two audio files will be more noticeable to the human user than a mismatch in timing between the video and the audio. Therefore, the present method uses a continuous and unmodified audio file, and inserts the corresponding video segments in the time slots for the video, and make any necessary adjustments on the video in order to match the video and its corresponding sound track. This reduces the precision requirement in the matching and audio/video composite process. In some embodiments, the server automatically selects the first and second video clips from a pool of first and second video clips submitted from different terminals, without regard to the terminal operating system type. In some embodiments, the server selects the pair of first and second video clips based on the user descriptions of the users that submitted the video clips.

Furthermore, in order to eliminate the need to separately decode the first and second video clips and re-encode the video clips using the same parameters before joining the videos, the server optionally packages the videos with an additional set of identifiers (e.g., sps_id and pps_id) that identifies the native operating system type of the video clips, such that the video player can automatically switch between the sps and pps parameters for the different operating system types when decoding each portion of the joined video clip.

In a specific example, a method of obtaining a video file by means of joining by using the foregoing multimedia file joining method can be applied to client software, "Quan Min Ying Ding" ("all people acting king"), to enable a "Quan Min Ying Ding" client to join a first video clip of a first terminal and a second video clip of a second terminal, to obtain a joined video file. For example, a user A of the first terminal and a user B of the second terminal put on a lip-syncing joint performance on a movie clip, a television clip, or an MTV clip. Assuming that the user A and the user B put on a joint performance of a video clip about Leonardo at the Oscar Award ceremony, where the user A acts as a presenter, and the user B acts as Leonardo, the user A and the user B can record their respective videos according to audio materials (that is, the foregoing audio file) provided in "Quan Min Ying Ding", to respectively obtain a first video clip and a second video clip. Because in processes in which the users record the videos, a case that a time length of the video clip recorded by the user A is longer than a time length of audio of the user A in the audio materials (that is, the foregoing audio file) may occur. Therefore, the video clip recorded by the user A may be adjusted such that the video clip recorded by the user A is played back in the first time period, to prevent a phenomenon that lips are out of sync with the audio in a subsequent process of playing the combined audio and video clips, thereby further implementing synchronous play of the audio file and the video file obtained by joining the first video file and the second video file (the first and second video files are recorded in silent mode with no audio track or with their audio tracks removed after the recording).

During a development process of the foregoing "Quan Min Ying Ding" game client, technical personnel develop a material authoring tool to rapidly produce audio in popular movies and jokes into audio materials suitable for lip synching and acting out. In addition to the foregoing complete audio materials (that is, the foregoing audio file), roles of the audio materials and a length of each segment of the audio materials may also be marked by using description files. During a recording process of the user, facial beautification and lens filtration may also be performed on the video clip recorded by the user in real time by using a GPU, and subtitle content is presented on a recording interface in a rolling manner, to prompt the user to put on a lip-sync performance with reference to the subtitle content.

It should be noted that in this embodiment of this application, the first video clip and the second video clip may be silent video clips, and in the following embodiments, the first video clip and the second video clip both being silent video clips is used as an example for description.

Optionally, the adjusting the first video clip to play the first video clip in a first time period indicated by the first and end time points includes: if a play length of the first video clip is greater than the first time period, adjusting a play end moment of the first video clip to a first play moment of the first video clip, so that a play length from a play start moment to the first play moment of the first video clip equals the first time period; or if a play length of the first video clip is less than the first time period, prolonging a last video frame of the first video clip until a play length of the prolonged first video clip equals the first time period.

Preferably, it is assumed that in the "Quan Min Ying Ding" game, when a play length of the first video clip recorded by the user A of the first terminal is greater than the first time period, the play end moment of the first video clip may be adjusted to the first play moment. The play length between the first play moment and the play start moment of the first video clip equals the first time period. For example, the play start moment of the first video clip is t1, the play end moment thereof is t2, and a play length between t1 and t2 is greater than a first time period t. In this case, a play end moment t2 of the first video clip may be adjusted to a first play moment T1, to make a play length between T1 and t1 equal the first time period t.

If the play length of the first video clip (that is, the play length between t1 and t2) is less than the first time period, a last video frame of the first video clip may be prolonged (e.g., extended or stretched), that is, playing of an image of the last video frame of the first video clip is prolonged until the play length of the first video clip equals the first time period.

The adjusting the second video clip to play the second video clip in a second time period indicated by the second and end time points includes: if a play length of the second video clip is greater than the second time period, adjusting a play end moment of the second video clip to a second play moment of the second video clip, so that a play length from a play start moment to the second play moment of the second video clip equals the second time period; or if a play length of the second video clip is less than the second time period, prolonging a last video frame of the second video clip until a play length of the prolonged second video clip equals the second time period.

Preferably, it is assumed that in the "Quan Min Ying Ding" game, when a play length of the second video clip recorded by the user A of the second terminal is greater than the second time period, the play end moment of the second video clip may be adjusted to the second play moment. The play length between the second play moment and the play start moment of the second video clip equals the second time period. For example, the play start moment of the second video clip is t1', the play end moment thereof is t2', and a play length between t1' and t2' is greater than a second time period t'. In this case, a play end moment t2' of the second video clip may be adjusted to a second play moment T1', to make a play length between T1' and t1' equal the second time period t'.

If the play length of the second video clip (that is, the play length between t1' and t2') is less than the second time period, a last video frame of the second video clip may be prolonged, that is, playing of an image of the last video frame of the second video clip is prolonged until the play length of the second video clip equals the second time period.

After the adjusted first video clip and the adjusted second video clip are joined according to a predetermined order, the obtained video file is further synthesized with the audio file. That is, the video file is played in a video track, and the audio file is played in an accompanying audio track. Hence, during a playing process, the video file and the audio file can be synchronously played, thereby preventing a problem that lip positions of the user are not synchronous with a sound of the audio file because of a millisecond deviation between the play length of the first video clip and the first time period or a millisecond deviation between the play length of the second video clip and the second time period. The predetermined order is an order of the first start and end time points and the second start and end time points in play time of the audio file.

Optionally, the adjusting a play end moment of the first video clip to a first play moment of the first video clip includes: adding the first video clip to a first storage area corresponding to the first time period in a first file, where when the play length of the first video clip is greater than the first time period, a first video part from the play start moment to the first play moment of the first video clip in the first video clip is stored in the first storage area; and when the play length of the first video clip is less than the first time period, the first video clip is stored in the first storage area.

To ensure that each video clip in the joined video file and the audio file are synchronously played, a play length of the entire audio file may be defined, and a time period of a sound, corresponding to each video clip, in the audio file may be defined. Therefore, it is ensured that the first video clip and the second video clip need to be strictly played in corresponding time periods. To ensure that the first video clip is strictly played in the first time period, when the play length of the first video clip is greater than the first time period, a first video part from the play start moment to the first play moment in the first video clip may be added to a storage area corresponding to the first time period in a first file; and when the play length of the first video clip is less than the first time period, the first video clip may be stored in the first storage area. The first file may be any newly created file.

Preferably, in this embodiment of this application, a manner of adding the first video clip to the first storage area is: compressing each picture frame of the first video clip and each picture frame of the second video clip into a respective bit stream unit, that is, a respective NAL, where a sum of display time lengths of all NALs of each video clip is equal to a time length of a play length of the video clip; then, putting one NAL of the first video clip into a first storage area of a first file at a time, and calculating a sum of time of all the NALs of the first video clip that have currently been put into the first storage area; when the sum of time is less than the first time period, continuously putting in another NAL of the first video clip; when the sum of time is just greater than the first time period, discarding subsequent NALs of the first video clip, and shortening display time of a last NAL of the first video clip in order to put it into the first storage space, so as to play the first video clip (truncated) in the first time period; and alternatively, if, after all of the NALs of the first video clip are put into the first storage space, the sum of time of the NALs of the first video clip is still less than the first time period, prolonging (e.g., stretch or extend) the display time of the last NAL (that is, the foregoing last video frame) of the first video clip put into the first storage space file until a play length of the prolonged first video clip equals the first time period.

The adjusting a play end moment of the second video clip to a second play moment of the second video clip includes: adding the second video clip to a second storage area corresponding to the second time period in a second file, where when the play length of the second video clip is greater than the second time period, a second video part from the play start moment to the second play moment of the second video clip in the second video clip is stored in the second storage area; and when the play length of the second video clip is less than the second time period, the second video clip is stored in the second storage area.

To ensure that the second video clip is strictly played in the second time period, when the play length of the second video clip is greater than the second time period, a second video part from the play start moment to the second play moment in the second video clip may be added to an storage area corresponding to the second time period in the second file; and alternatively, when the play length of the second video clip is less than the second time period, the second video clip may be stored in the second storage area.

Preferably, in this embodiment of this application, a manner of adding the second video clip to the second storage area is as follows: compressing each picture frame of the second video clip and each picture frame of the first video clip into a respective bit stream unit, that is, a respective NAL, where a sum of display time lengths of all NALs of a respective video clip is equal to a time length of a play length of the video clip; then, putting one NAL of the second video clip into a second storage area of a second file at a time, and calculating a sum of time of all the NALs of the second video clip that have been put into the second storage area; when the sum of time is less than the second time period, continuously putting in another NAL of the second video clip; when the sum of time is just greater than the second time period, discarding subsequent NALs of the second video clip, and shortening display time of a last NAL put into the second storage space, so as to play the second video clip in the second time period; and alternatively, after all of the NALs of the second video clip are put into the second storage space, if the sum of time of the NALs is still less than the second time period, prolonging the display time of the last NAL (that is, the foregoing last video frame) put into the second storage space file until a play length of the prolonged second video clip equals the second time period.

Optionally, the performing a joining operation on the adjusted first video clip and the adjusted second video clip includes: performing the joining operation on the adjusted first video clip and the adjusted second video clip according to an order of the first start and end time points and the second start and end time points in play time of the audio file.

Preferably, after the first video clip and the second video clip are adjusted by using the foregoing method, the first video file and the second video file may be joined according to an order of the first start and end time points and the second start and end time points in play time of the audio file.

For example, in the audio file, a play order of the first video clip and the second video clip is: first playing the first video clip, and then, playing the second video clip after a predetermined time period. In this way, the first video clip and the second video clip may be joined according to the order, to obtain a video file. Further, the video file and the audio file are synthesized, so that synchronous playing of the video file and the audio file can be implemented.

Optionally, after the performing a joining operation on the adjusted first video clip and the adjusted second video clip, the method includes: obtaining a first decoding parameter used for decoding the first video clip, and obtaining a second decode parameter used for decoding the second video clip; and decoding the first video clip in the joined video file by using the first decoding parameter, and decoding the second video clip in the joined video file by using the second decoding parameter.

Preferably, in the foregoing process of generating the joined video file, joining of the video files is completed without performing operations related to decoding and encoding on the first video clip and the second video clip, so that performance of video joining is greatly improved. When the joined video file is played, the first video clip and the second video clip may be decoded. For example, when the first video clip in the video file is played, the first video clip is decoded by using the first decoding parameter, and when the second video clip in the video file is played, the second video clip is decoded by using the second decoding parameter.

It should be noted that in this embodiment of this application, the foregoing first decoding parameter may be sps and pps parameters of a video created on a first operating system, and the second decoding parameter may also be sps and pps parameters of a video created on a second operating system that is distinct from the first operating system.

In this embodiment of this application, when a video clip is recorded in an Android system, picture data captured by a video recording apparatus of a terminal to which the Android system belongs is compressed and encoded by using the x264 library, to obtain a video clip, where the video clip includes a plurality of video bit streams; and then, the video bit streams in the video clip in the Android system are extracted, the video bit streams are packaged into a mp4 video container by using a library mp4v2, where both sps_id and pps_id may be specified to a first value (e.g., 1), and the sps and pps parameters are both put into the mp4, where sps_id is a value of an IP address of the sps parameter, and pps_id is a value of an IP address of the pps parameter. When the first video clip of the video file is decoded, the corresponding sps parameter and pps parameter may be searched for by using the IP addresses of the sps and pps, so as to decode the first video clip of the video file by using the sps parameter and the pps parameter corresponding to the sps_id and pps_id of the first value.

When a video clip is recorded in an IOS system, picture data captured by a video recording apparatus of a terminal to which the IOS system belongs is compressed and encoded by using the x264 library, to obtain a video clip, where the video clip includes a plurality of video bit streams; and then, the video bit streams in the IOS video clip are extracted, and the video bit streams are packaged into a mp4 video container by using a library mp4v2, where both sps_id and pps_id may be specified to a second value (e.g., 0), where sps_id is a value of an IP address of the sps parameter, and pps_id is a value of an IP address of the pps parameter. When the second video clip of the video file is decoded, the corresponding sps parameter and pps parameter may be searched for by using the IP addresses of the sps and pps, so as to decode the second video clip of the video file by using the sps parameter and the pps parameter corresponding to the sps_id and pps_id of the second value.

After the foregoing processing, when a player plays the video file and needs to decode the video bit streams of the Android system, the player may decode the video clip generated by the Android system by using the sps and pps parameters whose sps_id and pps_id are the first value (e.g., 1); and when the player needs to decode the video bit streams of the IOS system, the player may decode the video clip generated by the IOS system by using the sps and pps parameters whose sps_id and pps_id are the second value (e.g., 0).

It should be noted that in this embodiment of this application, values of sps_id and pps_id of the video clips on terminals running a same operating system are specified to be the same, and values of sps_id and pps_id of the video clips on terminals running different operating systems are specified to be different.

When the first video clip and the second video clip are joined by using the foregoing embodiment of this application, a problem of incompatibility between video clips from a plurality of operating systems, such as video clips from an IOS system and an Android system, is resolved, so that segmented videos recorded by different terminal platforms can be accurately joined. Meanwhile, completely recorded video clips can be automatically synthesized by using the foregoing embodiment of this application, to accelerate synthesis of the video clip, thereby improving video joining efficiency. Further, when the first video clip and the second video clip are joined by using the foregoing method, a problem that the audio file is not synchronous with lip positions in the video file because of a millisecond deviation between the play length of the first video clip and the first time period or a millisecond deviation between the play length of the second video clip and the second time period can be prevented, and the sense of reality of a recording effect is improved.

Figure 3:
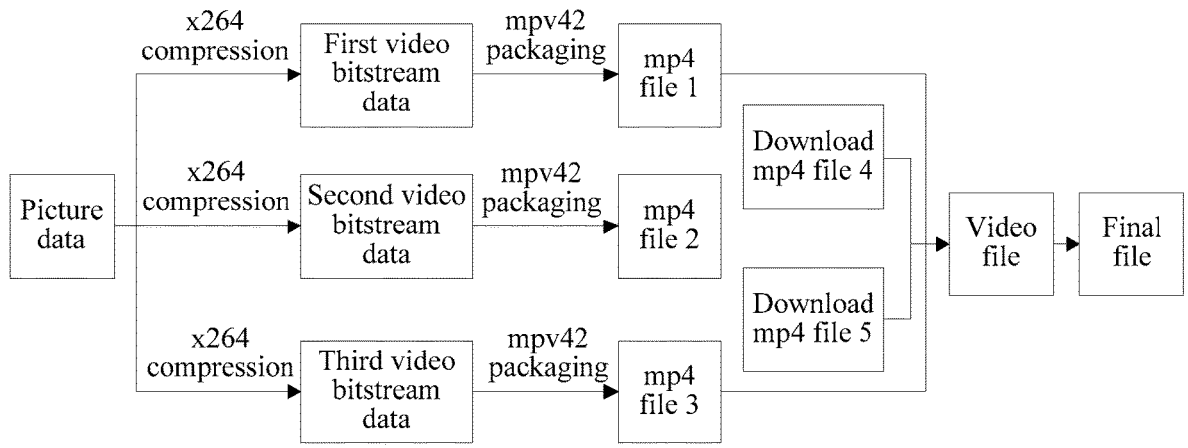
FIG. 3 is a flowchart of an optional multimedia file joining method according to an embodiment of this application.

FIG. 3 is a flowchart of an optional multimedia file joining method according to an embodiment of this application. As shown in FIG. 3, a user A records three videos by using a video recorder of a local terminal, then, can compress and decode picture data of the three videos captured by the video recorder by using the x264 library, to separately generate first video bit stream data, second video bit stream data, and third video bit stream data, and then, the foregoing first video bit stream data, second video bit stream data, and third video bit stream data are packaged into an mp4 file 1, an mp4 file 2, and an mp4 file 3 by using the library mp4v2, to obtain three segmented videos. After generation of the foregoing segmented videos is completed, the segmented videos and a video recorded by a mysterious partner, are used to form complete video content. As shown in FIG. 3, a video clip B and a video clip C recorded by a user B and a user C are joined. Preferably, the video clip B and the video clip C recorded by the user B and the user C can be downloaded by a local terminal by using a client, where the video clip B of the user B is stored into the mp4 file 4, and the video clip C of the user C is stored into the mp4 file 5; then, the video clips in the mp4 file 1 to the mp4 file 5 are joined by using the foregoing method, to obtain a joined video file; and finally, the video file and the audio file are synthesized, to obtain and play a final file. In this embodiment of this application, a process of synthesizing the video file and the audio file by using the foregoing method utilizes a feature that humans are very sensitive to a tiny exception of audio, but are not so perceptive to out-of-sync on a millisecond level between a video and audio, thereby effectively reducing technical difficulty of a solution.

When the foregoing plurality of video clips is joined, the joining is performed strictly according to a time length of each video clip specified by technical personnel. For example, if a video clip lasts 1600 milliseconds, a deviation may exist in a recording process, a time length of the video clip is slightly longer than or slightly shorter than the target time length (that is, the foregoing first time period and second time period), and special processing can be performed herein to strictly control the time length of each video clip to be the accurate target time length, where the special processing has been described in the foregoing embodiment, and details are not described herein again.

It should be noted that, with regard to the foregoing method embodiments, for the purpose of simple description, the method embodiments are described as combinations of a series of actions, but a person skilled in the art should learn that this application is not limited by the described order of the actions, as some steps can, in accordance with this application, be performed in other orders or concurrently. Next, a person skilled in the art should also learn that, the embodiments described in the specification all fall within preferred embodiments, and the related actions and modules are not necessarily required by this application.

Through the descriptions of the preceding embodiments, a person skilled in the art may understand that the methods according to the foregoing embodiments may be implemented by hardware only or by software and a necessary universal hardware platform. However, in most cases, using software and a necessary universal hardware platform are preferred. Based on such an understanding, the technical solutions of the embodiments of this application essentially, or the part contributing to the prior art may be implemented in a form of a software product. The computer software product is stored in a storage medium (such as a ROM/RAM, a magnetic disk, or an optical disc) and includes several instructions for instructing a terminal device (which may be a mobile phone, a computer, a server, a network device, or the like) to perform the methods described in the embodiments of this application.

According to the embodiments of this application, a multimedia file joining apparatus is further provided to implement the foregoing multimedia file joining method, the multimedia file joining apparatus is mainly configured to execute the multimedia file joining method provided by the foregoing content of the embodiments of this application, and the multimedia file joining apparatus provided by the embodiments of this application is specifically described below.

Figure 4:
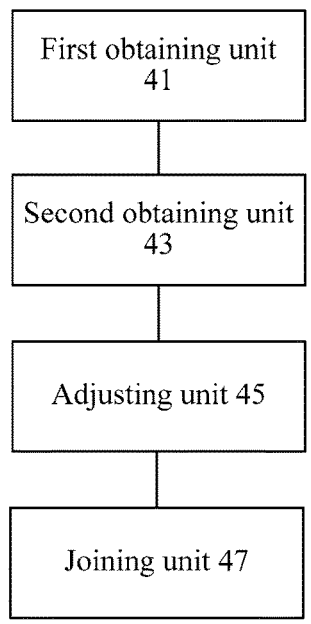
FIG. 4 is a schematic of a multimedia file joining apparatus according to an embodiment of this application.

FIG. 4 is a schematic of a multimedia file joining apparatus according to an embodiment of this application. As shown in FIG. 4, the multimedia file joining apparatus mainly includes the following.

A first obtaining unit 41 is configured to obtain a first video clip and a second video clip to be joined, the first video clip being from a first terminal, the second video clip being from a second terminal, and the first terminal and the second terminal running different operating systems.

Preferably, the first terminal and the second terminal are terminals running different operating systems. For example, the first terminal runs an Android system, and the second terminal runs an IOS system, or the first terminal runs a Windows system, and the second terminal runs an IOS system, and so on. The first video clip may be a video recorded by a user by using the first terminal, and the second video clip may be a video recorded by a user by using the second terminal.

In this embodiment of this application, the first terminal may be a plurality of terminals, and the plurality of terminals runs a same operating system, so that the first video clip is a plurality of video clips from a plurality of different first terminals; and the second terminal may be a plurality of terminals, and the plurality of terminals runs a same operating system, so that the second video clip is a plurality of video clips from a plurality of different second terminals. Further, this application is not limited to the foregoing first terminal and second terminal, and may further include a third terminal. An operating system running on the third terminal is different from both of the operating systems running on the first terminal and the second terminal.

A second obtaining unit 43 is configured to obtain an audio file corresponding to the first video clip and the second video clip, the audio file recording first start and end time points of the first video clip and second start and end time points of the second video clip.

Preferably, the foregoing first start and end time points are a play start time point and a play end time point of the first video clip that have been recorded in the audio file, and the second start and end time points are a play start time point and a play end time point of the second video clip that have been recorded in the audio file.

An adjusting unit 45 is configured to adjust the first video clip to play the first video clip in a first time period indicated by the first and end time points, and adjust the second video clip to play the second video clip in a second time period indicated by the second and end time points, the first time period not overlapping the second time period.

Preferably, to ensure that the first video clip is played in the first time period indicated by the first start and end time points, an image played in the first time period may be adjusted according to a time length of the first time period. Correspondingly, to ensure that the second video clip is played in the second time period indicated by the second start and end time points, an image played in the second time period may be adjusted according to a time length of the second time period.

A joining unit 47 is configured to perform a joining operation on the adjusted first video clip and the adjusted second video clip, to obtain a joined video file.

In this embodiment of this application, the video files and the audio file can be accurately docked by adjusting the obtained first video clip from the first terminal into the first time period indicated by the first and end time points, and adjusting the obtained second video clip from the second terminal into the second time period indicated by the second and end time points, so as to increase video file and audio file joining precision, thereby producing a technical effect of synchronously playing the video files and the audio file, and further resolving the technical problem of relatively low synthesis precision in audio and video joining processes in related technologies.

Optionally, the adjusting unit includes: a first adjusting module, configured to if a play length of the first video clip is greater than the first time period, adjust a play end moment of the first video clip to a first play moment of the first video clip, so that a play length from a play start moment to the first play moment of the first video clip equals the first time period; and a second adjusting module, configured to if a play length of the first video clip is less than the first time period, prolong a last video frame of the first video clip until a play length of the prolonged first video clip equals the first time period; and the adjusting unit includes: a third adjusting module, configured to if a play length of the second video clip is greater than the second time period, adjust a play end moment of the second video clip to a second play moment of the second video clip, so that a play length from a play start moment to the second play moment of the second video clip equals the second time period; and a fourth adjusting module, configured to if a play length of the second video clip is less than the second time period, prolong a last video frame of the second video clip until a play length of the prolonged second video clip equals the second time period.

Optionally, the first adjusting module is configured to add the first video clip to a first storage area corresponding to the first time period in a first file, where when the play length of the first video clip is greater than the first time period, a first video part from the play start moment to the first play moment of the first video clip in the first video clip is stored in the first storage area; and when the play length of the first video clip is less than the first time period, the first video clip is stored in the first storage area; and the third adjusting module is configured to add the second video clip to a second storage area corresponding to the second time period in a second file, where when the play length of the second video clip is greater than the second time period, a second video part from the play start moment to the second play moment of the second video clip in the second video clip is stored in the second storage area; and when the play length of the second video clip is less than the second time period, the second video clip is stored in the second storage area.

Optionally, the joining unit includes a joining module, configured to perform the joining operation on the adjusted first video clip and the adjusted second video clip according to an order of the first start and end time points and the second start and end time points in play time of the audio file.

Optionally, the apparatus includes a third obtaining unit, configured to after a joining operation is performed on the adjusted first video clip and the adjusted second video clip, obtain a first decoding parameter used for decoding the first video clip, and obtain a second decode parameter used for decoding the second video clip; and a decoding unit, configured to decode the first video clip in the joined video file by using the first decoding parameter, and decode the second video clip in the joined video file by using the second decoding parameter.

Figure 5:
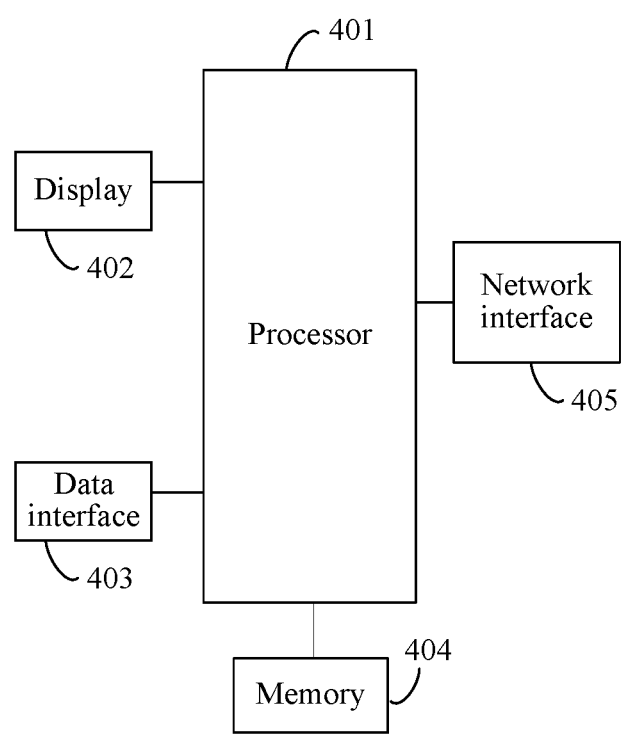
FIG. 5 is a diagram of a hardware structure of a terminal according to an embodiment of this application.

According to the embodiments of this application, a mobile terminal for implementing the foregoing multimedia file joining method is further provided. As shown in FIG. 5, the mobile terminal mainly includes a processor 401, a display 402, a data interface 403, a memory 404, and a network interface 405.

The display 402 is mainly configured to display an interface of a client, where the interface of the client includes a video or audio file recorded by a user using the client.

The data interface 403 transmits a video clip recorded by the user to the server 401 in a data transmission manner.

The memory 404 is mainly configured to store the video clip recorded by the user.

The network interface 405 is mainly configured to perform network communication with the server 401, to provide data support for joining of the video clip.

The processor 401 is mainly configured to perform the following operations:

obtaining a first video clip and a second video clip to be joined, the first video clip being from a first terminal, the second video clip being from a second terminal, and the first terminal and the second terminal running different operating systems; obtaining an audio file corresponding to the first video clip and the second video clip, the audio file recording first start and end time points of the first video clip and second start and end time points of the second video clip; adjusting the first video clip to play the first video clip in a first time period indicated by the first and end time points, and adjusting the second video clip to play the second video clip in a second time period indicated by the second and end time points, the first time period not overlapping the second time period; and performing a joining operation on the adjusted first video clip and the adjusted second video clip, to obtain a joined video file.

The processor 401 is further configured to if a play length of the first video clip is greater than the first time period, adjust a play end moment of the first video clip to a first play moment of the first video clip, so that a play length from a play start moment to the first play moment of the first video clip equals the first time period; if a play length of the first video clip is less than the first time period, prolong a last video frame of the first video clip until a play length of the prolonged first video clip equals the first time period; if a play length of the second video clip is greater than the second time period, adjust a play end moment of the second video clip to a second play moment of the second video clip, so that a play length from a play start moment to the second play moment of the second video clip equals the second time period; and if a play length of the second video clip is less than the second time period, prolong a last video frame of the second video clip until a play length of the prolonged second video clip equals the second time period.

The processor 401 is further configured to add the first video clip to a first storage area corresponding to the first time period in a first file, where when the play length of the first video clip is greater than the first time period, a first video part from the play start moment to the first play moment of the first video clip in the first video clip is stored in the first storage area; and when the play length of the first video clip is less than the first time period, the first video clip is stored in the first storage area; and add the second video clip to a second storage area corresponding to the second time period in a second file, where when the play length of the second video clip is greater than the second time period, a second video part from the play start moment to the second play moment of the second video clip in the second video clip is stored in the second storage area; and when the play length of the second video clip is less than the second time period, the second video clip is stored in the second storage area.

Optionally, the processor 401 is further configured to when performing a joining operation on the adjusted first video clip and the adjusted second video clip, perform the joining operation on the adjusted first video clip and the adjusted second video clip according to an order of the first start and end time points and the second start and end time points in play time of the audio file.

Optionally, the processor 401 is further configured to after performing a joining operation on the adjusted first video clip and the adjusted second video clip, obtain a first decoding parameter used for decoding the first video clip, and obtain a second decode parameter used for decoding the second video clip; and decode the first video clip in the joined video file by using the first decoding parameter, and decode the second video clip in the joined video file by using the second decoding parameter.

This embodiment of this application further provides a storage medium. Optionally, in this embodiment, the foregoing storage medium may store program code of the multimedia file joining method of the embodiments of this application.

Optionally, in this embodiment, the foregoing storage medium may be located in at least one of a plurality of network devices in a network such as a mobile communications network, a wide area network, a metropolitan area network, or a local area network.

Optionally, in this embodiment, the storage medium is set to store program code used for performing the following steps:

S1: Obtain a first video clip and a second video clip to be joined, the first video clip being from a first terminal, the second video clip being from a second terminal, and the first terminal and the second terminal running different operating systems.

S2: Obtain an audio file corresponding to the first video clip and the second video clip, the audio file recording first start and end time points of the first video clip and second start and end time points of the second video clip.

S3: Adjust the first video clip to play the first video clip in a first time period indicated by the first and end time points, and adjust the second video clip to play the second video clip in a second time period indicated by the second and end time points, the first time period not overlapping the second time period.

S4: Perform a joining operation on the adjusted first video clip and the adjusted second video clip, to obtain a joined video file.

Optionally, in this embodiment, the foregoing storage medium may include but is not limited to: any medium that can store program code, such as a USB flash drive, a read-only memory (ROM), a random access memory (RAM), a removable hard disk, a magnetic disk, or an optical disc.

Optionally, in this embodiment, the foregoing storage medium may include but is not limited to: any medium that can store program code, such as a USB flash drive, a read-only memory (ROM), a random access memory (RAM), a removable hard disk, a magnetic disk, or an optical disc.

Optionally, for a specific example in this embodiment, refer to the examples described in Embodiment 1 and Embodiment 2, and details are not described herein again in this embodiment.

The sequence numbers of the preceding embodiments of this application are merely for description purpose but do not indicate the preference of the embodiments.

When the integrated unit in the foregoing embodiment is implemented in a form of a software functional module and sold or used as an independent product, the integrated unit may be stored in the foregoing computer-readable storage medium. Based on such an understanding, the technical solutions of the embodiments of this application essentially, or the part contributing to the prior art, or all or some of the technical solutions may be implemented in a form of a software product. The computer software product is stored in a storage medium and includes several instructions for instructing one or more computer devices (which may be a personal computer, a server, a network device, or the like) to perform all or some of the steps of the methods described in the embodiments of this application.

In the foregoing embodiments of this application, descriptions of the embodiments have different emphases, and as for parts that are not described in detail in one embodiment, reference can be made to the relevant description of the other embodiments.

In the several embodiments provided in the present application, it should be understood that the disclosed client may be implemented in other manners. The described apparatus embodiments are merely exemplary. For example, the unit division is merely logical function division and may be other division during actual implementation. For example, multiple units or components may be combined or integrated into another system, or some features may be ignored or not performed. In addition, the displayed or discussed mutual couplings or direct couplings or communication connections may be implemented through some interfaces. The indirect couplings or communication connections between the units or modules may be implemented in electronic or other forms.

The units described as separate parts may or may not be physically separate, and the parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of this application may be integrated into one processing unit, or each of the units may exist alone physically, or two or more units may be integrated into one unit. The integrated unit may be implemented in a form of hardware, or may be implemented in a form of a software functional unit.

The above descriptions are merely preferred embodiments of this application, and it should be noted that, a person of ordinary skill in the art may make various improvements and refinements without departing from the spirit of this application. All such modifications and refinements should also be intended to be covered by this application.

What is claimed is:

1. A multimedia file joining method, comprising:
   at a computing device including one or more processors and memory:
   obtaining a first video clip and a second video clip that are to be joined, the first video clip being from a first terminal, the second video clip being from a second terminal, and the first terminal and the second terminal running different operating systems;
   obtaining an audio file corresponding to the first video clip and the second video clip, the audio file recording first start and end time points of the first video clip and second start and end time points of the second video clip;
   adjusting the first video clip to play the first video clip in a first time period indicated by the first and end time points, further including:
     if a play length of the first video clip is greater than the first time period, adjusting a play end moment of the first video clip to a first play moment of the first video clip, so that a play length from a play start moment to the first play moment of the first video clip equals the first time period; and
     if the play length of the first video clip is less than the first time period, prolonging a last video frame of the first video clip until a play length of the prolonged first video clip equals the first time period; and
   adjusting the second video clip to play the second video clip in a second time period indicated by the second and end time points, the first time period not overlapping the second time period, further including:
     if a play length of the second video clip is greater than the second time period, adjusting a play end moment of the second video clip to a second play moment of the second video clip, so that a play length from a play start moment to the second play moment of the second video clip equals the second time period; and
     if the play length of the second video clip is less than the second time period, prolonging a last video frame of the second video clip until a play length of the prolonged second video clip equals the second time period; and
   performing a joining operation on the adjusted first video clip and the adjusted second video clip, to obtain a joined video file.

2. The method according to claim 1, wherein
   the adjusting the play end moment of the first video clip to the first play moment of the first video clip comprises: adding the first video clip to a first storage area corresponding to the first time period in a first file, wherein when the play length of the first video clip is greater than the first time period, a first video part from the play start moment to the first play moment of the first video clip in the first video clip is stored in the first storage area; and when the play length of the first video clip is less than the first time period, the first video clip is stored in the first storage area; and the adjusting the play end moment of the second video clip to the second play moment of the second video clip comprises: adding the second video clip to a second storage area corresponding to the second time period in a second file, wherein when the play length of the second video clip is greater than the second time period, a second video part from the play start moment to the second play moment of the second video clip in the second video clip is stored in the second storage area; and when the play length of the second video clip is less than the second time period, the second video clip is stored in the second storage area.

3. The method according to claim 1, wherein the adjusting the first video clip to play the first video clip in a first time period indicated by the first and end time points includes stretching the first video clip to fit into the first time period indicated by the first and end time points.

4. The method according to claim 1, wherein the adjusting the second video clip to play the second video clip in a second time period indicated by the second and end time points includes truncating the second video clip to fit into the second time period indicated by the second and end time points.

5. The method according to claim 1, wherein the performing the joining operation on the adjusted first video clip and the adjusted second video clip comprises:

performing the joining operation on the adjusted first video clip and the adjusted second video clip according to an order of the first start and end time points and the second start and end time points in play time of the audio file.

6. The method according to claim 1, wherein after the performing the joining operation on the adjusted first video clip and the adjusted second video clip, the method comprises:

obtaining a first decoding parameter to be used for decoding the first video clip, and obtaining a second decode parameter to be used for decoding the second video clip, the first decoding parameter being distinct from the second decoding parameter; and decoding the first video clip in the joined video file by using the first decoding parameter, and decoding the second video clip in the joined video file by using the second decoding parameter.

7. The method according to claim 6, wherein after the performing the joining operation on the adjusted first video clip and the adjusted second video clip, the method comprises:

including a first parameter identifier with the first video clip in the joined video file; and including a second parameter identifier with the second video clip in the joined video file, wherein the first parameter identifier and the second parameter identifier are distinct and are selected based on respective operating systems on which the first and second video clips were created.

8. A system, comprising:
one or more processors; and
memory storing instructions, the instructions, when executed by the one or more processors, cause the processors to perform:

obtaining a first video clip and a second video clip that are to be joined, the first video clip being from a first terminal, the second video clip being from a second terminal, and the first terminal and the second terminal running different operating systems;

obtaining an audio file corresponding to the first video clip and the second video clip, the audio file recording first start and end time points of the first video clip and second start and end time points of the second video clip;

adjusting the first video clip to play the first video clip in a first time period indicated by the first and end time points, further including:

if a play length of the first video clip is greater than the first time period, adjusting a play end moment of the first video clip to a first play moment of the first video clip, so that a play length from a play start moment to the first play moment of the first video clip equals the first time period; and if the play length of the first video clip is less than the first time period, prolonging a last video frame of the first video clip until a play length of the prolonged first video clip equals the first time period; and adjusting the second video clip to play the second video clip in a second time period indicated by the second and end time points, the first time period not overlapping the second time period, further including:

if a play length of the second video clip is greater than the second time period, adjusting a play end moment of the second video clip to a second play moment of the second video clip, so that a play length from a play start moment to the second play moment of the second video clip equals the second time period; and if the play length of the second video clip is less than the second time period, prolonging a last video frame of the second video clip until a play length of the prolonged second video clip equals the second time period; and performing a joining operation on the adjusted first video clip and the adjusted second video clip, to obtain a joined video file.

9. The system according to claim 8, wherein the adjusting the play end moment of the first video clip to the first play moment of the first video clip comprises: adding the first video clip to a first storage area corresponding to the first time period in a first file, wherein when the play length of the first video clip is greater than the first time period, a first video part from the play start moment to the first play moment of the first video clip in the first video clip is stored in the first storage area; and when the play length of the first video clip is less than the first time period, the first video clip is stored in the first storage area; and the adjusting the play end moment of the second video clip to the second play moment of the second video clip comprises: adding the second video clip to a second storage area corresponding to the second time period in a second file, wherein when the play length of the second video clip is greater than the second time period, a second video part from the play start moment to the second play moment of the second video clip in the second video clip is stored in the second storage area; and when the play length of the second video clip is less than the second time period, the second video clip is stored in the second storage area.

10. The system according to claim 8, wherein the performing the joining operation on the adjusted first video clip and the adjusted second video clip comprises:

performing the joining operation on the adjusted first video clip and the adjusted second video clip according to an order of the first start and end time points and the second start and end time points in play time of the audio file.

11. The system according to claim 8, wherein the processors further perform:
  after the performing the joining operation on the adjusted first video clip and the adjusted second video clip:
    obtaining a first decoding parameter to be used for decoding the first video clip, and obtaining a second decode parameter to be used for decoding the second video clip, the first decoding parameter being distinct from the second decoding parameter; and
    decoding the first video clip in the joined video file by using the first decoding parameter, and decoding the second video clip in the joined video file by using the second decoding parameter.

12. The system according to claim 11, wherein the processors further perform:
  after the performing the joining operation on the adjusted first video clip and the adjusted second video clip:
  including a first parameter identifier with the first video clip in the joined video file; and
  including a second parameter identifier with the second video clip in the joined video file, wherein the first parameter identifier and the second parameter identifier are distinct and are selected based on respective operating systems on which the first and second video clips were created.

13. A non-transitory computer-readable storage medium storing instructions, the instructions, when executed by one or more processors, cause the processors to perform:
  obtaining a first video clip and a second video clip that are to be joined, the first video clip being from a first terminal, the second video clip being from a second terminal, and the first terminal and the second terminal running different operating systems;
  when the play length of the first video clip is less than the first time period, the first video clip is stored in the first storage area; and
  the adjusting the play end moment of the second video clip to the second play moment of the second video clip comprises: adding the second video clip to a second storage area corresponding to the second time period in a second file, wherein when the play length of the second video clip is greater than the second time period, a second video part from the play start moment to the second play moment of the second video clip in the second video clip is stored in the second storage area; and when the play length of the second video clip is less than the second time period, the second video clip is stored in the second storage area.

14. The computer-readable storage medium according to claim 13, wherein
  the adjusting the play end moment of the first video clip to the first play moment of the first video clip comprises: adding the first video clip to a first storage area corresponding to the first time period in a first file, wherein when the play length of the first video clip is greater than the first time period, a first video part from the play start moment to the first play moment of the first video clip in the first video clip is stored in the first storage area; and
  including a second parameter identifier with the second video clip in the joined video file, wherein the first parameter identifier and the second parameter identifier are distinct and are selected based on respective operating systems on which the first and second video clips were created.

15. The computer-readable storage medium according to claim 13, wherein the performing the joining operation on the adjusted first video clip and the adjusted second video clip comprises:
  performing the joining operation on the adjusted first video clip and the adjusted second video clip according to an order of the first start and end time points and the second start and end time points in play time of the audio file.

16. The computer-readable storage medium according to claim 13, wherein the processors further perform:
  after the performing the joining operation on the adjusted first video clip and the adjusted second video clip:
    obtaining a first decoding parameter to be used for decoding the first video clip, and obtaining a second decode parameter to be used for decoding the second video clip, the first decoding parameter being distinct from the second decoding parameter; and
    decoding the first video clip in the joined video file by using the first decoding parameter, and decoding the second video clip in the joined video file by using the second decoding parameter.

17. The computer-readable storage medium according to claim 13, wherein the processors further perform:
  after the performing the joining operation on the adjusted first video clip and the adjusted second video clip:
  including a first parameter identifier with the first video clip in the joined video file; and
  obtaining an audio file corresponding to the first video clip and the second video clip, the audio file recording first start and end time points of the first video clip and second start and end time points of the second video clip;
  adjusting the first video clip to play the first video clip in a first time period indicated by the first and end time points, further including:
    if a play length of the first video clip is greater than the first time period, adjusting a play end moment of the first video clip to a first play moment of the first video clip, so that a play length from a play start moment to the first play moment of the first video clip equals the first time period; and
    if the play length of the first video clip is less than the first time period, prolonging a last video frame of the first video clip until a play length of the prolonged first video clip equals the first time period; and
  adjusting the second video clip to play the second video clip in a second time period indicated by the second and end time points, the first time period not overlapping the second time period, further including:
    if a play length of the second video clip is greater than the second time period, adjusting a play end moment of the second video clip to a second play moment of the second video clip, so that a play length from a play start moment to the second play moment of the second video clip equals the second time period; and
    if the play length of the second video clip is less than the second time period, prolonging a last video frame of the second video clip until a play length of the prolonged second video clip equals the second time period; and performing a joining operation on the adjusted first video clip and the adjusted second video clip, to obtain a joined video file.

* * * * *